United States Patent [19]

Johnson

[11] 4,369,258

[45] Jan. 18, 1983

[54] POLYURETHANE FOAM COMPOSITIONS AND A PROCESS FOR MAKING SAME USING A MELAMINE POLYOL

[75] Inventor: Douglas L. Johnson, Franklin Lakes, N.J.

[73] Assignee: American Cyanamid Company, Stamford, Conn.

[21] Appl. No.: 285,720

[22] Filed: Jul. 22, 1981

[51] Int. Cl.³ ............................................. C08G 18/14
[52] U.S. Cl. .................................... 521/107; 521/115; 521/118; 521/159; 521/165; 521/166
[58] Field of Search ............... 521/107, 115, 118, 159, 521/165, 166

[56] References Cited

U.S. PATENT DOCUMENTS

| | | | |
|---|---|---|---|
| 3,328,321 | 6/1967 | Wismer et al. | 521/131 |
| 3,824,240 | 7/1974 | Narayan et al. | 521/166 |
| 3,981,829 | 9/1976 | Cenker et al. | 521/118 |
| 4,040,922 | 8/1977 | Wang et al. | 204/159.15 |
| 4,139,501 | 2/1979 | Rudner et al. | 521/118 |

Primary Examiner—Maurice J. Welsh
Attorney, Agent, or Firm—Steven J. Hultquist

[57] ABSTRACT

Polyurethane foams having improved physical properties are prepared by reacting a polyisocyanate and polyol in the presence of a melamine polyol which contains no polyether linkages and a foaming agent.

11 Claims, No Drawings

POLYURETHANE FOAM COMPOSITIONS AND A PROCESS FOR MAKING SAME USING A MELAMINE POLYOL

The present invention relates to polyurethane foam compositions which are prepared by a process which comprises reacting a polyisocyanate and a polyol in the presence of a melamine polyol. The process permits a wide range of processing rates, such as cream time, rise time and tack free time. The polyurethane foams prepared by the process of the invention are characterized by improved compressive strength, flame retardance, and reduced friability.

Polyurethane foams are well-known, and they have a wide variety of uses. However, there is a continuing need to find polyurethane foams which exhibit improvement in one or more physical properties, such as strength, toughness and flame retardance. It would also be desirable to have a method for preparing these polyurethane foams which does not suffer from one or more of the disadvantages of current processes.

U.S. Pat. No. 3,328,321 discloses the use of melamine polyols prepared from an amino-s-triazine and an alkylene oxide or alkylene carbonate in making cellular polyurethanes. When the polyol is thus prepared it contains a plurality of ether linkages. While the disclosure of the patent suggests the use of a melamine polyol not having ether linkages, it does not teach how to make such compounds nor does it teach that there is any difference in results be there ether linkages present or not. It has now been discovered that when the melamine polyol is devoid of ether linkages, the resultant polyurethane foam exhibits improved compressive strength and/or reduced friability.

In accordance with the present invention, a polyurethane foam composition is prepared by reacting a polyisocyanate with a polyol in the presence of a melamine polyol and a foaming agent.

The melamine polyols useful in the instant invention are those represented by the formula:

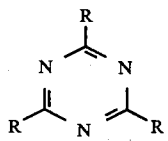

wherein each R is $NH_2$, an alkyl ($C_2$–$C_{12}$) amine or a hydroxy-alkyl ($C_2$–$C_4$) substituted amine, and on average there is at least about 1 hydroxy group per molecule. The hydroxyalkyl substituted amino groups include $NHCH_2CH_2OH$, $NHCH_2CH(OH)CH_3$, $NHCH(CH_3)CH_2OH$, and $NHCH_2CH_2CH_2OH$, and the like. Of course, two or more molecules of the melamine polyol may be combined by reaction with a diamine such as ethylene diamine or hexamethylene diamine, and these compounds are included within the scope of the above formula. These polyols may be prepared by reacting an alkanolamine with an amino-s-triazine, i.e., melamine as disclosed in U.S. Pat. No. 4,312,988 issued Jan. 26, 1982, and elsewhere.

Preferred melamine polyols correspond to the above formula wherein on average at least about 1.8 R groups per molecule are $NHCH_2CH(OH)CH_3$ and the remainder $NH_2$, and more preferably wherein on average about 2.4 to 2.8 R groups per molecule are $NHCH_2CH(OH)CH_3$. Most preferably, melamine polyols wherein the R group is either $NHCH_2CH_2OH$ or $NHCH_2CH(OH)CH_3$ are employed.

The amount of melamine polyol used is that which is sufficient to catalyze the polyisocyanate-polyol reaction. Typically, the melamine polyol is present in an amount equal to about 1 to 40% by weight, based on the total weight of the reaction mixture. Preferably, the amount of melamine polyol used is about 1.5 to 15%. It is noted, however, that higher amounts of the melamine polyol may be used. It is believed, although not wishing to be bound by any theory, that when relatively higher amounts of the melamine polyol are used, the same functions not only as a catalyst for the reaction, but also as a polyol serving to further improve the physical properties of the resultant foam. Accordingly, it is seen that the optimum amount of melamine polyol to be used is best determined by routine experimentation, taking into consideration, inter alia, the particular polyisocyanate and polyol being reacted and the properties desired in the resultant foam composition.

It is to be understood that, in addition to the melamine polyol catalyst, other conventional catalysts may be included if desired. Such conventional catalysts include, for example, tin compounds such as dibutyltin dilaurate, tri-octyltin oxide, tin octoate, hexabutylditin and tributyltin phosphate; and stannic chloride; amines, such as tetramethylethylenediamine, triethylenediamine, dimethylaminoethanol, bis(dimethylaminoethyl)ether, triethylamine, trimethylamine, diethylene triamine, tetramethylbutane diamine and dimethylcyclohexylamine; morpholine compounds, such as N-methyl morpholine, N-acetyl morpholine and 4,4'-dithiomorpholine; antimony compounds, such as antimony caprylate, antimony naphthenate and antimonious chloride. Other catalysts include the trimerization catalysts such as sulfonium, phosphonium and ammonium carboxylates described in U.S. Pat. No. 4,040,922 and International Progress in Urethanes, K. C. Frisch et al, Vol. 1 (1977), incorporated herein by reference. Usage of these catalysts would be in accordance with convention although, obviously, it is not necessary that a specific minimum amount be used.

The polyol compounds to be used in the process of the present invention are those conventionally used in making polyurethane foams. Such polyols include, but are not limited to, polyether polyols based on glycerine, trimethylolpropane, sorbitol, linear polyethylene oxide diols, linear polypropylene oxide diols, mixed ethylene oxide/propylene oxide diols, polytetra-methylene glycol, linear polyester diols, and aryl- and polyaryl-containing polyols. Obviously, mixtures of various polyols may also be used. Polyester polyols may also be used.

Polyisocyanates useful in the process of this invention include aliphatic polyisocyanates, alicyclic polyisocyanates and aromatic polyisocyanates. Exemplary polyisocyanate compounds include, but are not limited to, hexamethylene diisocyanate, 1,4-phenylene diisocyanate, polymethylene polyphenyl isocyanate, methylene bis(4-phenylisocyanate), the various isomers of toluene diisocyanate, 3,3'-bitoluene-4,4'-diisocyanate, naphthalene-1,4-diisocyanate, 3-isocyanomethyl-3,5,5-trimethylisocyanate, 4,4'-methylene bis-(cyclohexylisocyanate), and isophorone diisocyanate. Mixtures of polyisocyanate compounds may also be employed. Generally the polyisocyanate compound should have a functionality of at least about 2.2.

As is well-known in the art, polyurethane foams are typically characterized by the ratio of NCO to OH groups present therein. This ratio is expressed as the isocyanate index of the foam wherein a mole ratio of 1:1 equals an index of 100. Polyurethane foams generally have isocyanate indexes of about 105 to 120. However, foams having larger indexes, such as, for example from 300 to 800, may also be made, and these foams are commonly referred to as polyurethane-modified polyisocyanurate foams or simply polyisocyanurate foams. In accordance with the process of the instant invention, foams having any isocyanate index may be prepared. The term "polyurethane foam", as used herein, is deemed to include polyisocyanurate foams.

A foaming agent is also included within the reaction mixture of the polyol, polyisocyanate and melamine polyol, and any foaming agent commonly used in the art may be employed. Suitable foaming agents include, but are not limited to, water (carbon dioxide), fluorocarbons, such as trichlorofluoromethane, trichlorotrifluoroethane, difluoromonochloroethane, and difluorodichloroethane, and mixtures of fluorocarbons with chlorocarbons such as methylene chloride. Fluorocarbons are preferred foaming agents since they improve some properties of the resultant foams.

Generally, the foaming agent comprises about 1 to 50%, by weight, based on the total weight of the reaction mixture. As is obvious to those skilled in the art, however, the amount used in a given instance will depend, inter alia, upon the particular foaming agent being used and the desired properties of the resultant foam.

In accordance with one embodiment of the process of the present invention, the so-called "one-shot" process, the polyol, the foaming agent and the melamine polyol are mixed together. Typically, the melamine polyol is dissolved directly into the polyol, or it may be used as a solution in, for example, ethylene glycol. The polyisocyanate is then added and the mixture is stirred, creating the foam.

In another embodiment of the process of the invention, the foam is prepared according to the "prepolymer" method. In accordance with this embodiment, about one-half of the melamine polyol is mixed with the polyisocyanate and the remainder of the melamine polyol is separately mixed with the other ingredients, i.e., the polyol and the foaming agent. The melamine polyol-polyisocyanate pre-polymer is then mixed into the other ingredients and the foam is formed. Generally, about 50 to 75% of the isocyanate groups are reacted to form the prepolymer.

Although the foams produced by the method of the present invention possess improved physical properties without the necessity of incorporating other additives thereinto, such conventional additives may be added in order to further enhance the properties of the foam. For example, surfactants may be added to control cell structure; antimony or phosphorous compounds, may further improve the fire resistance of the foam; fillers, such as clay, calcium sulfate or ammonium phosphate may be added to lower the cost; components, such as dyes, may be added for color; and fibrous glass, asbestos, synthetic fibers or the like may be incorporated into the foam to further improve strength characteristics.

In accordance with the present invention, rigid, semi-rigid and flexible polyurethane foams may be prepared by the selection of, inter alia, appropriate reactants, as is obvious to those skilled in the art.

The following examples, wherein the foams were prepared according to the "on-shot" process unless other specified, illustrate the present invention, but are not intended to be limitative thereof. All parts and percentages are by weight unless otherwise noted.

EXAMPLE 1

Three rigid polyurethane foams were prepared, each having an isocyanate index of 105. The control foam (a) had the following components:

|  | Parts by Weight |
|---|---|
| Aromatic polyether polyol[1] | 100 |
| Triethylene diamine[2] | 1.25 |
| Silicone Surfactant | 1.5 |
| Water | 1.0 |
| Trichlorofluoromethane | 40 |
| Polyisocyanate[3] | 114.5 |

[1]Pluracol TM 824, BASF Wyandotte Corp.
[2]Dabco TM 33LV, Air Products Co.
[3]Mondur TM MR, Mobay Chemical Co. (a polymer of 4,4-diphenyl-methane diisocyanate).

In the second foam (b), in place of the amine catalyst and part of the polyol, a 50% solution of hydroxisopropylmelamine (HPM) in ethylene glycol was used. The HPM solution had an average of 2.5 $NHCH_2CHOHCH_3$ groups per molecule (the remainder being $NH_2$) and a hydroxyl number of 1170. The foam had the following components:

|  | Parts by Weight |
|---|---|
| Aromatic polyether polyol[1] | 90 |
| 50% HPM Solution | 10 |
| Silicone Surfactant | 1.5 |
| Water | 1.0 |
| Trichlorofluoromethane | 40 |
| Polyisocyanate[3] | 133.8 |

In the third foam (c), solid HPM with a hydroxyl number of 530 was substituted for the amine catalyst and part of the polyol. The foam had the following components:

|  | Parts by Weight |
|---|---|
| Aromatic polyether polyol[1] | 90 |
| HPM | 10 |
| Silicone Surfactant | 1.5 |
| Water | 1.0 |
| Trichlorofluoromethane | 40 |
| Polyisocyanate[3] | 117.9 |

The process rates and physical properties for the three foams, which were each poured into an open mold, are set forth in Table I.

As can be seen from Table I, the polyurethane foams of the present invention [Samples (b) and (c)] have superior physical properties when compared to the control foam. In addition, use of the HPM permits variation of the process rates.

TABLE I

| Foam | HPM | Process Rates (sec) | | | Physical Properties | | | | |
|---|---|---|---|---|---|---|---|---|---|
| | | Cream | Rise | Tack-Free | Density[1] | Compressive Strength[2] | Friability[3] | Oxygen Index[4] | Closed Cell[5] |
| a | No | 20 | 135 | 170 | 1.3 | 10.4 | 24.8 | 19.8 | 90 |
| b | Yes | 23 | 115 | 125 | 1.4 | 13.2 | 9.2 | 20.4 | 95 |
| c | Yes | 10 | 60 | 70 | 1.4 | 12.5 | 11.7 | 20.6 | 96 |

[1]ASTM 1622, lb./cu. ft.
[2]ASTM D1671 (Parallel to rise), lb./sq. in.
[3]ASTM C421, % weight loss
[4]ASTM 2863
[5]ASTM D2856-70 (Method B), % closed

EXAMPLE 2

Three more rigid foams were prepared as per Example 1. Each foam had an isocyanate index of 105.

The control foam (d) had the following components:

| | Parts by Weight |
|---|---|
| Aromatic polyether polyol[4] | 100 |
| Triethylene diamine[2] | 2.25 |
| Dibutyltin dilaurate | 0.08 |
| Silicone Surfactant | 1.5 |
| Trichlorofluoromethane | 40 |
| Polyisocyanate[3] | 92.6 |

[4]Niax ™ BE-375, Union Carbide Corp.

For the foam (e), the 50% HPM solution of Sample (b) above replaced the amine catalyst and part of the polyol in the foam (d). The foam had the following components:

| | Parts by Weight |
|---|---|
| Aromatic polyether polyol[4] | 80 |
| 50% HPM Solution | 20 |
| Dibutyltin dilaurate | 0.08 |
| Silicone Surfactant | 1.5 |
| Trichlorofluoromethane | 40 |
| Polyisocyanate[3] | 132.5 |

For the foam (f), solid HPM of (c) replaced both the amine and tin catalysts and part of the polyol of control sample (d). The foam had the following components:

| | Parts by Weight |
|---|---|
| Aromatic polyether polyol[4] | 90 |
| HPM | 10 |
| Silicone Surfactant | 1.5 |
| Trichlorofluoromethane | 40 |
| Polyisocyanate[3] | 96.6 |

The process rates and physical properties of the foams after pouring in an open mold are set forth in Table II.

The results shown on Table II again demonstrate the superiority of the physical properties of the polyurethane foams of the present invention over those which are prepared without the use of a melamine polyol as a catalyst-coreactant. Also, the process rates may be varied as desired.

TABLE II

| Foam | HPM | Process Rates (sec) | | | Physical Properties | | |
|---|---|---|---|---|---|---|---|
| | | Cream | Rise | Tack-Free | Density | Compressive Strength | Friability | Oxygen Index |
| d | No | 18 | 65 | 85 | 1.5 | 13.7 | 8.2 | 20.4 |
| e | Yes | 8 | 25 | 40 | 1.6 | 16.7 | 3.7 | 21.4 |
| f | Yes | 10 | 80 | 100 | 1.6 | 16.1 | 4.9 | 21.0 |

COMPARATIVE EXAMPLE

Two additional polyurethane foams, having isocyanate indexes of 115, were prepared to determine the effect of using a melamine polyol which contains ether linkages. The control foam (g) had the following components:

| | Parts by Weight |
|---|---|
| Polyether polyol[5] | 100 |
| Triethylene diamine[2] | 1.7 |
| Dibutyltin dilaurate | 0.2 |
| Silicone Surfactant | 2.5 |
| Trichlorofluoromethane | 43 |
| Polyisocyanate[3] | 100.4 |

[5]PEP-650, BASF Wyandotte Corp.

A polyether polyol melamine derivative was prepared from melamine and propylene oxide in a dimethylsulfoxide solvent. Each molecule thereof had an average of 9 propylene oxide units attached thereby having an average of 2 ether linkages per chain or 6 per molecule. It was used in place of the amine and tin catalysts and part of the polyol. The foam (h) had the following components:

| | Parts by Weight |
|---|---|
| Polyether polyol[5] | 85 |
| Melamine polyether polyol | 15 |
| Silicone Surfactant | 2.5 |
| Trichlorofluoromethane | 43 |
| Polyisocyanate[3] | 95.9 |

The process rates and physical properties of the foams (g) and (h) are set forth in Table III.

As is graphically illustrated in the Table, use of a melamine polyether polyol derivative (not within the group of melamine polyol compounds of the present invention) did not improve the properties of the polyurethane foam as compared to the control. In fact, many of the properties measured were less desirable than those of the control.

TABLE III

| Foam | Melamine Polyether Polyol | Process Rates (sec) | | | Physical Properties | | | |
|---|---|---|---|---|---|---|---|---|
| | | Cream | Rise | Tack-Free | Density | Compressive Strength | Friability | Oxygen Index |
| g | NO | 32 | 95 | 151 | 1.5 | 11.0 | 9.8 | 18.4 |
| h | YES | 36 | 190 | 330 | 1.2 | 8.9 | 10.6 | 19.0 |

EXAMPLE 3

Two polyisocyanurate foams, each having an isocyanate index of 300, were prepared. The control foam (i) had the following components:

| | Parts by Weight |
|---|---|
| Polyethylene oxide (molecular weight 400) | 100 |
| Potassium octoate | 0.8 |
| Silicone Surfactant | 2.0 |
| Trichlorofluoromethane | 50 |
| Polyisocyanate[3] | 200 |

In the foam of this invention (j), solid HPM (as per foam b above) replaced a portion of the polyol. The foam had the following components:

| | Parts by Weight |
|---|---|
| Polyethylene oxide | 75 |
| HPM | 25 |
| Potassium octoate | 1.6 |
| Silicone Surfactant | 4 |
| Trichlorofluoromethane | 57 |
| Polyisocyanate[3] | 306 |

The process rates and physical properties of the resulting foams are given in Table IV.

The improvement brought about in the physical properties by the use of the melamine polyol is readily apparent, as is the increased speed of the various process rates.

TABLE IV

| Foam | HPM | Process Rates (sec) | | | Physical Properties | | | |
|---|---|---|---|---|---|---|---|---|
| | | Cream | Rise | Tack Free | Density | Compressive Strength | Friability | Oxygen Index |
| i | No | 15 | 45 | 95 | 1.9 | 24.5 | 6.0 | 21.5 |
| j | Yes | 10 | 30 | 50 | 1.9 | 34.1 | 2.6 | 24.0 |

EXAMPLE 4

A rigid polyurethane foam is prepared from the following components:

| | Parts by Weight |
|---|---|
| Aromatic polyether polyol[4] | 90 |
| HPM | 10 |
| Silicone surfactant | 2 |
| Trichlorofluoromethane | 40 |
| Distilled 2,4-isomer of toluene diisocyanate[6] | 63.5 |

[6]Hylene T, E.I. DuPont de Nemours and Company.

The foam has an isocyanate index of 105 and has a cream time, rise time and tack free time similar to that of a foam made with a conventional catalyst. However, the compressive strength of the foam is greater, and the friability is lower, than the foam made using a conventional catalyst.

EXAMPLE 5

This Example illustrates a method of making a polyurethane foam of the present invention in accordance with the so-called "pre-polymer" process.

The following components were thoroughly mixed together:

| | Parts by Weight |
|---|---|
| 50% HPM solution (in ethylene glycol)(from Example 1b) | 15 |
| Silicone surfactant | 1.5 |
| Water | 1.0 |
| Trichlorofluoromethane | 40 |

Thereupon, a prepolymer comprising 15 parts, by weight, of a 50% HPM solution (in ethylene glycol) in 167.2 parts, by weight, of a polymer of 4,4-diphenylmethane diisocyanate was added, the entire solution was stirred with a high speed stirrer and poured into an open mold. The isocyanate index of the foam was 105.

The process rates and physical properties of the foam are set out in Table V.

As can be seen from the Table, the physical properties, particularly the compressive strength, friability and oxygen index, of this foam are vastly superior to those of the foam of Example 1(a), wherein no melamine polyol was used.

TABLE V

| Process Rates (sec) | | | Physical Properties | | | |
|---|---|---|---|---|---|---|
| Cream | Rise | Tack-Free | Density | Compressive Strength | Friability | Oxygen Index |
| 10 | 40 | 50 | 1.4 | 15.3 | 4.9 | 21.6 |

EXAMPLE 6

A polyurethane foam was made as described in Example 1 except that a melamine polyol (average of 2.5 ethanol units/melamine) was used in place of the catalyst and part of the polyether polyol. The melamine polyol was not completely soluble in the polyether polyol at room temperature. A partially soluble and fine dispersion of the melamine polyol in the polyether polyol was prepared by heating a mixture of the two polyols to approximately 100° C. with good agitation and then cooling to room temperature. Foams were cast as described in Example 1.

| Materials | Parts by Weight |
| --- | --- |
| Polyether polyol[5] | 90 |
| Hydroxyethyl melamine | 10 |
| Silicone surfactant | 4 |
| Trichlorofluoromethane | 51 |
| Polymeric MDI[3] | 105 |
| Isocyanate Index = 105 | |

Cream time was 12 sec.; rise time 80 sec.; tackfree time 154 sec. Density was 1.1 lb. per cu. ft. and compressive strength (parallel to rise) was 10.2 psi. This is an unexpectedly high strength for such a low density rigid foam.

What is claimed is:

1. In a polyurethane foam prepared from a polyisocyanate, a polyol, and a foaming agent, the improvement which comprises incorporating therein prior to foaming an amount sufficient to improve the resultant foam of a melamine polyol of the formula

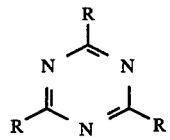

wherein each R is $NH_2$, an alkyl ($C_2$-$C_{12}$) amine, or a hydroxyalkyl ($C_2$-$C_4$) substituted amine and there is an average at least about one hydroxy group per melamine polyol molecule.

2. The polyurethane foam of claim 1 wherein the amount of melamine polyol present is about 1 to 40%, by weight, based on the total weight of the reaction mixture.

3. The polyurethane foam of claim 1 wherein the amount of melamine polyol present is about 1.5 to 15%, by weight, based on the total weight of the reaction mixture.

4. The polyurethane foam of claim 1 further containing a catalyst selected from the group consisting of N-methyl morpholine, 4,4'-dithiomorpholine, antimony caprylate, antimony naphenate, antimonious chloride, dibutyltin dilaurate, tri-n-octyltin oxide, hexabutyltin, tributyltin phosphate, stannic chloride, tetramethylethylenediamine, triethylenediamine, dimethylaminoethanol, bis(dimethylaminoethyl)ether, triethylamine, trimethylamine, diethylene triamine, tetramethyl butane diamine and dimethylcyclohexylamine.

5. The polyurethane foam of claims 1 or 2 wherein on average at least about 1.8 of the R groups per molecule are $NHCH_2CH(OH)CH_3$ and the remainder are $NH_2$.

6. The polyurethane foam of claims 1 or 2 wherein on average about 2.4 to 2.8 of the R groups per molecule are $NHCH_2CH(OH)CH_3$ and the remainder are $NH_2$.

7. The polyurethane foam of claims 1 or 2 wherein at least one R is $NHCH_2CH_2OH$ or $NHCH_2CH(OH)CH_3$.

8. The polyurethane foam of claim 1 wherein the polyol is a polyether polyol.

9. The polyurethane foam of claim 1 wherein the polyisocyanate is one or more isomers of toluene diisocyanate.

10. The polyurethane foam of claim 1 wherein the polyisocyanate is polymethylene polyphenyl isocyanate.

11. The polyurethane foam of claim 1 wherein the polyisocyanate and at least a portion of the polyol or melamine polyol are reacted to form a prepolymer prior to the addition of the foaming agent.

* * * * *